Sept. 19, 1967 L. E. FOLK ET AL 3,342,429

MOTOR DRIVEN WIRE SUPPLIER

Filed Oct. 22, 1965

INVENTOR.
Lee E. Folk
John R. Hugill

BY

Mueller, Aichele & Rauner

ATT'YS.

United States Patent Office 3,342,429

Patented Sept. 19, 1967

3,342,429

MOTOR DRIVEN WIRE SUPPLIER

Lee E. Folk and John R. Hugill, Phoenix, Ariz., assignors to Motorola, Inc., Franklin Park, Ill., a corporation of Illinois Filed Oct. 22, 1965, Ser. No. 501,608
1 Claim. (Cl. 242—45)

This invention relates to apparatus for supplying wire and more particularly to apparatus for supplying wire used in semiconductor devices to an intermittently operating mechanism.

In the fabrication of a semiconductor device fine wire, between about .3 and 1 mil in diameter, is often used for electrically connecting a semiconductor element with external leads. Of the many methods used for joining this wire to the semiconductor element and the external leads, thermocompression welding is one of the most widely utilized because of its many advantageous features.

In conventional thermocompression welding practice a large supply of wire, capable of making many connections, is often used to reduce the number of individual pieces handled. This wire is generally pulled from a freely turning spool as it is consumed in the bonding operation.

To enable the bonding assembly to pull the wire, a hook or bend is formed in the wire, when it is cut, to catch on the bonding tip. This bend should be strong enough to withstand the pull required to overcome the friction of the feeding system and the starting inertia of the spool of wire. Because of the small size of this wire and its inherent weakness, the starting inertia of the spool is kept low by using a diameter of about ½ inch. If the hook straightens the bonding assembly is likely to be partially dethreaded. This results in substantial loss of production time during rethreading and, at times, replacement of damaged equipment.

The use of a small diameter freely turning spool results in many detrimental effects. The wire coming from the spool often has a twist or a set condition which causes a rotation of the wire after bonding and cutoff. This rotation causes the hook to be in an improper location on the bonding tip, resulting in substantially difficulty in making effective connections. To correct the position of the hook when this condition occurs, the operator of the bonding assembly bonds onto an adjacent area of the unit being assembled and again cuts the wire. This operation may be repeated two or three times before the proper position of the hook is obtained and cause as much as 17% loss of production time. Because of the uneven pull or tension existing with a freely turning spool, slack may form in the wire. The combination of this slack and the twist or set condition often results in the formation of kinks or knots in the fine wire. This kinking or knotting often jams the fine opening in the capillary tube of the bonding assembly, resulting in loss of production time and possible damage to the bonding assembly.

It is an object of this invention to provide apparatus to reduce the cost of forming wire bonds with fine wires in semiconductor devices by increasing the rate of production of the wire bonding equipment.

It is another object of this invention to provide apparatus that will supply a limited amount of fine wire to a bonding assembly, thereby preventing the jamming of this equipment by forming slack in the wire.

It is a further object of this invention to provide apparatus to supply fine wire to a bonding assembly that will permit the formation of a wire hook in a desired position, thereby permitting a higher rate of production.

A feature of this invention is a novel apparatus for intermittently supplying fine wire having a driven wire supply responsive to the motion of a wire joiner.

Another feature of this invention is apparatus for supplying fine wire utilizing a fast acting system for controlling the motion of a wire supply. In this manner, a limited amount of wire is supplied to the bonding assembly, and excessive slack is not formed in the wire.

Figures 1, 2, 3:
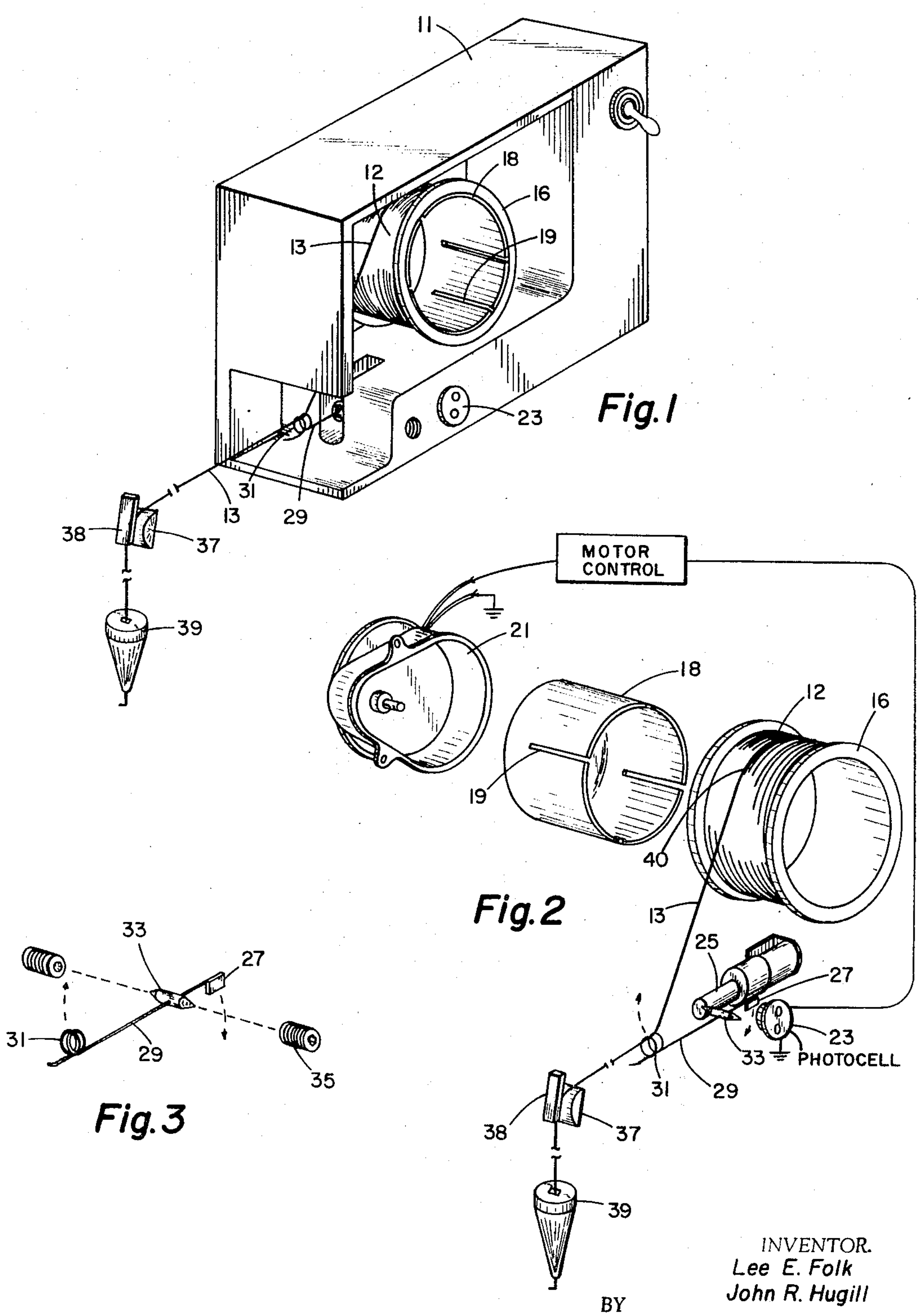
FIG. 1 is an enlarged perspective view of a wire feeding assembly in accordance with the present invention.
FIG. 2 is an exploded perspective view of the main functioning elements for supplying wire.
FIG. 3 is a detailed perspective view of a light interrupting element and cooperating apparatus.

This invention is embodied in apparatus for intermittently supplying fine wire to an intermittently operating joiner. The apparatus includes a wire supply containing fine wire with a suitable driving arrangement to positively drive the wire supply. A source of light is aimed at a light sensitive cell to supply energy to make the cell operate. The amount of light received by the cell is varied by a light interrupting element. A guide for the wire is operatively joined with the interrupting element. A limiting means confines the movement of the light interrupting within a desired range. A controlling means regulates the operation of the motor. Thus, the fluctuating movement of the light interrupting element causes light from the light source to strike the light sensitive cell. This activates the controlling means and causes the driving arrangement to drive the wire supply.

A wire feeding apparatus according to this invention, as shown in FIG. 1, includes a housing 11 on which various elements of the wire feeding apparatus may be conveniently mounted. Housing 11 is fabricated to provide a compact rigid mounting surface for these elements. Its shape is such that it will conveniently hold the required elements. Housing 11 supports a spool 12 containing a fine wire 13. Spool 12 is a flanged cylinder about 2 inches in diameter. Flanges 16, besides adding rigidity, help to retain fine wire 13 on spool 12.

Spool 12 is mounted on a hub 18 which is a cylinder that is closed on one end and open on the opposite end. Four evenly spaced longitudinal slots 19 originating between the open and closed ends of hub 18 and terminating at the open end thereof, permit sufficient variation in the diameter of hub 18 for spool 12 to be readily mounted thereon with a press fit. Hub 18 is joined to a motor 21, FIG. 2, by two bolts (not shown). In this way, spool 12 is directly driven by motor 21.

A synchronous motor is preferred because, besides being able to start rapidly, it has a self braking characteristic that stops it rapidly when the power is removed. As will become clear in the explanation of the operation of this apparatus, rapid starting and stopping of motor 21 is a desirable characteristic.

Motor 21 is dependent upon a light sensitive cell 23 for activation and deactivation. To be operational this cell requires a light source 25 and a light interrupting element 27. Light sensitive cell 23 is activated by the incidence thereon of a level of light of a predetermined range of wavelengths. The intensity of light from source 25 is varied by light interrupting element 27 which is a material opaque to the activating wavelengths. Besides being opaque, this element is of light enough weight that it will counter balance a wire 29 with a double loop guide 31 in the opposed end.

Wire 29 has a pivot 33 mounted intermediate element 27 and guide 31 which pivots on two fine bearings 35, FIG. 3. The movement of guide 31 causes a corresponding movement of element 27. In this way the intensity of light striking cell 23 may be varied by moving guide 31. Positioned adjacent to guide 31 is a breakover or guide 37, FIG. 2, and pressure pad 38 which combine to maintain substantially constant tension in wire 13 passing therebetween. Breakover 37 is a short 180° segment of Teflon rod. Pad 38 is a piece of plastic which is capable of creating friction with wire 13. This combination supplies a fine wire at substantially constant tension to a bonding assembly 39 which moves intermittently along a vertical and horizontal axis. Since the bonding assembly pulls wire 13 at a substantially constant tension, as the wire is used, it tends to straighten between breakover 37 and the tangent point 40 with spool 12. Guide 31, through which wire 13 passes, moves upwardly as wire 13 straightens. Correspondingly, element 27 moves downwardly permitting light to enter cell 23. This activates motor 21 and starts spool 12 in motion. As wire 13 is fed from spool 12, guide 31 moves downwardly causing element 27 to once more block the light to cell 23. This deactivates motor 21 and stops the rotation of spool 12. In this way a small amount of wire is fed to the system. The amount of wire 13 fed is so small that spool 12 may start and stop rotation between about 4 and 6 times in each revolution.

The above description and drawings show that the present invention provides a novel apparatus for supplying wire used in semiconductor devices to an intermittently operating mechanism. Furthermore, by the apparatus of the invention the cost of wire bonding is reduced and the production rate increased. Moreover, the apparatus supplies a limited amount of wire, thereby preventing the jamming of equipment. Additionally, the wire supplied by the apparatus of the invention permits the formation of a hook in a desired position.

It will be apparent from the above description and drawings that various modifications in the detailed apparatus set forth may be made within the scope of the invention. Therefore, the invention is not intended to be limited to the specific apparatus except as may be required by the following claim.

We claim:

An intermittently operating wire supply apparatus for supplying a fine wire under substantially constant tension to a wire bonding assembly means, the wire bonding assembly means being movable along vertical and horizontal axes and operative to intermittently pull the wire as it is used from a source of slack wire, the wire being supplied to the source from a large diameter spool having wire wound thereon, the improvement including in combination, drive means selectively rotating the spool for unreeling a given length of wire, tensioning means intermediate the slack source of wire and wire bonding assembly means for providing a constant drag on the wire as the wire is pulled by the wire bonding assembly means, a light interrupting element, pivot means freely rotatably supporting said element, a wire guide on said pivot means opposite to said element and balanced about said pivot with respect to said element and movably receiving said wire without tensioning the wire and such that a small force is exerted on said guide by the wire as the slack is removed by intermittent use upsetting the balance in the pivot means for rotating said element about said pivot means, photocell means and a light source supplying light to said photocell means respectively disposed on opposite sides of said element such that said element selectively interrupts the light as said element is rotated for alternately placing said photocell means in activated and deactivated conditions as the wire is intermittently used and supplied, and said drive means being responsive to one of said photocell means conditions to selectively rotate said spool for removing said force from said guide to restore slack into the wire source and further responsive to a photocell means condition other than said one condition to stop said spool.

References Cited

UNITED STATES PATENTS

| | | | |
|---|---|---|---|
| 1,367,282 | 2/1921 | Sherpitis | 242—25 X |
| 1,964,874 | 7/1934 | Fankboner. | |
| 1,976,611 | 10/1934 | Gulliksen | 242—45 |
| 2,006,819 | 7/1935 | Zschach | 242—45 |
| 2,414,169 | 1/1947 | Raymond | 242—149 X |

FOREIGN PATENTS

| | | |
|---|---|---|
| 942,819 | 11/1963 | Great Britain. |

FRANK J. COHEN, *Primary Examiner.*

N. L. MINTZ, *Examiner.*